United States Patent Office 3,433,760
Patented Mar. 18, 1969

3,433,760
BLENDS OF LIQUID VINYL UNSATURATED HYDROCARBON POLYMERS WITH ORGANOPOLYSILOXANES
Harold A. Clark and Bernard Vanwert, Midland, Mich., assignors to Dow Corning Corporation, Midland, Mich., a corporation of Michigan
No Drawing. Filed Dec. 9, 1965, Ser. No. 512,798
U.S. Cl. 260—37        7 Claims
Int. Cl. H01b 3/46, 3/44; C08g 47/10

ABSTRACT OF THE DISCLOSURE

A curable silicone-organic resin having improved electrical properties includes 100 parts by weight of a mixture of 75 to 95 percent by weight of a liquid hydrocarbon polymer having vinyl unsaturation and a molecular weight of 1,500 to 100,000, such as a styrene butadiene copolymer, and 5 to 25 percent by weight of an organopolysiloxane having at least 2 silicon bonded hydrogen atoms, such as $(CH_3)_3SiO[H(CH_3)SiO]_3Si(CH_3)_3$, 1 to 4 parts by weight of an organic peroxide curing catalyst, a catalytic amount of platinum, 0 to 25 parts of a hydrocarbon plasticizer and 0 to 200 parts of a filler.

---

This application relates to heat-curable resins which are useful as varnishes for electric coils, circuitry, and the like, and as resins for glass laminates and molding compounds. The resins of this invention, which are predominantly made of organic materials, generally exhibit excellent stability at 150° C. while possessing electrical properties at that temperature which are superior to those of epoxy resins.

The curable composition of this invention consists essentially of:

(a) 100 parts by weight of an intimate mixture of (1) from 75 to 95 weight percent of a liquid hydrocarbon polymer having an average of at least five $>C=CH_2$ groups per molecule and having an average molecular weight of from 1,500 to 100,000, and (2) from 5 to 25 weight percent of at least one organopolysiloxane compound which is soluble in (1) and which has an average of at least 2.0 silicon-hydrogen bonds per molecule, the other bonds present in (2) being selected from the group consisting of the siloxane bond and $RSi\equiv$ bonds, where R is a monovalent hydrocarbon radical, free of aliphatic unsaturation, there being from 2 to 30 times as many $>C=CH_2$ groups in (1) as there are silicon-hydrogen bonds in (2), (b) From 1 to 4 parts of an organic peroxide curing catalyst, (c) A catalytic amount of platinum, (d) From 0 to 25 parts of an essentially saturated hydrocarbon plasticizer for (a), and (e) From 0 to 200 parts of a filler.

It is preferred for there to be at least five times as many $>C=CH_2$ groups in (1) as there are silicon-hydrogen bonds in (2).

The hydrocarbon polymer of (a) can be a liquid of low or medium viscosity, or it can be a liquid of such high viscosity that it is a gum. It cannot, however, be crosslinked into an insoluble, infusible resin since the other ingredients have to be intimately dispersed in the hydrocarbon polymer.

It is preferred for the hydrocarbon polymer to be a liquid of low or medium viscosity so that the compositions of this invention can be flowable without the presence of a volatile solvent.

The chemical nature of the polymer is limited to hydrocarbons in order to obtain the best electrical properties.

Examples of operative hydrocarbon polymers are polybutadiene, poly(ethylene - propylene - 1,5 - hexadiene), poly(alpha - methylstyrene - butadiene), poly(isoprene-styrene), poly(1,7-octadiene-vinylcyclopentane), and poly (styrene-vinylallylbenzene), where each polymer possesses the requisite number of $>C=CH_2$ groups and the proper molecular weight.

The preferred hydrocarbon polymer for ingredient (a) is a copolymer of butadiene and styrene which contains an average of at least 15 $>C=CH_2$ groups per molecule, and from 70 to 95 mol percent of butadiene units. Such copolymers are commercially available.

The pendant $>C=CH_2$ group which has been mentioned above can be placed into the polymers of this invention by methods which are well-known to the art. Butadiene, for example, can be copolymerized with styrene in the presence of an alkyl lithium compound so that the majority of the butadiene polymerizes in the 1,2 manner, resulting in pendant vinyl groups. Polymerized isoprene, for another example, can contain pendant alpha methylvinyl groups $$(-C=CH_2)$$
$$\phantom{(-}|\phantom{=CH_2)}$$
$$\phantom{(-}CH_3$$

The organopolysiloxane ingredient of (a) can be any one of the above description, e.g.,

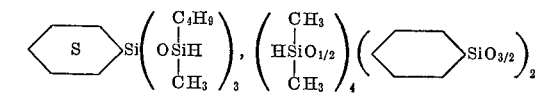

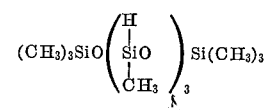

a blend of compounds of the average formula

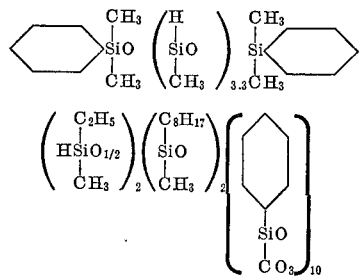

a blend of 2 moles of sym-diphenyl-dimethyldisiloxane and one mole of

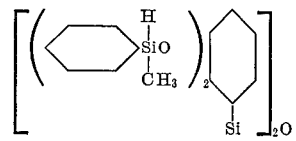

and

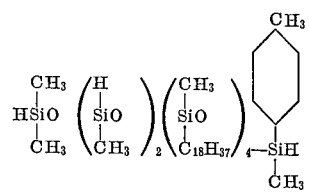

R defined above, can be any alkyl or cycloalkyl radical such as methyl, propyl, 2-ethylhexyl, dodecyl, octadecyl, myricyl, or cyclopentyl, or any aryl-containing radical such as phenyl, xenyl, naphthyl, tolyl, or 2-phenylpropyl.

As stated above, the amount of organopolysiloxane added should contain fewer moles of ≡SiH than the moles of >C=CH₂ which are present in the hydrocarbon polymer discussed above. The reason for this is that an excess of organopolysiloxane is unnecessary and therefore uneconomical. Also, it has been found that superior resins are produced through what is believed to be a dual crosslinking technique: (1) direct crosslinking of unsaturated groups in the hydrocarbon polymer through the use of the peroxide catalyst and (2) platinum-catalyzed crosslinking of the hydrocarbon polymer by means of the organopolysiloxane through the reaction of ≡SiH groups with the >C=CH₂ groups.

Ingredient (b) can be any organic peroxide which forms reactive free radicals on heating or other activation, e.g., ditertiarybutyl peroxide, tertiarybutyl peracetate, dicumyl peroxide, di-tertiarybutyl perbenzoate, benzoyl peroxide, stearoyl peroxide, cyclohexanone peroxide, or 2,4-dichlorobenzoyl peroxide. The preferred peroxides are those which have a half-life of at least one hour at 80° C.

Ingredient (c) can be platinum in any known catalytic form, e.g., platinum deposited on charcoal or gamma alumina, chloroplatinic acid, or platinum complexed with olefins such as ethylene, cyclohexene, or alpha-methylstyrene, or with olefinic silicones such as sym-divinyltetramethyldisiloxane.

The amount of ingredient (c) present is not critical, but generally from 0.00001 to 0.01 weight percent of platinum, based on the weight of (a), is used.

Ingredient (d), the plasticizer, can be any liquid, saturated, hydrocarbon which is compatible with ingredient (a). It is well-known what properties a plasticizer should have: it should be of low viscosity to make the resin composition less viscous or stiff, it should be nonvolatile so that it does not evaporate during cure, and it should be inexpensive in order to lower the price of the overall composition. The plasticizer serves to soften the cured composition and to make it more resilient.

Examples of suitable plasticizers for the composition of this invention depend in part on the nature of ingredient (a), as suitable plasticizers must be compatible with ingredient (a). When (a) contains a butadiene-styrene copolymer, suitable plasticizers are liquid polyisobutylene or mineral oil. These plasticizers are also generally suitable for use with other ingredients (a).

Ingredient (e) can be any desired filler such as glass fibers, glass powder, titania, alumina, molybdenum disulfide, and preferably, powdered silica.

The composition of this invention can be prepared by any technique of intimately mixing the ingredients, although it should be noted that high temperature milling of the composition is likely to cause premature curing. Available techniques are low temperature mixing or milling, or vigorous mixing of the ingredients in the presence of a solvent such as hexane or toluene followed by evaporation of the solvent in a vacuum.

The uncured composition of this invention can be anything from a fluid to a material resembling an uncured rubber stock. The curing temperature must be sufficiently high to activate the curing catalysts, but apart from that limitation, any curing temperature which is above about 60° C. is operative, although higher temperatures yield a more rapid cure. Temperatures of above 170° C. should generally be avoided so that the resin will not degrade. The curing time depends on the nature of the curable composition and the curing temperature, but it generally varies from a few minutes to several hours.

The compositions of this invention can be placed in a volatile solvent such as naphtha, thereby becoming useful as heat-curable varnishes for generator and transformer coils. They can also be used by themselves without solvent as encapsulating resins for circuitry and as laminating resins for use in conjunction with glass fabric in the preparation of circuit boards, radomes, etc.

EXAMPLE 1

To 85 parts by weight of a viscous, fluid copolymer of about 85 mol percent of butadiene and 15 mol percent of styrene, where about 85 percent of the butadiene is polymerized to form $$-CH_2-CH- \\ \overset{|}{\underset{\|}{CH}} \\ CH_2$$

units, there being more than 15 of these latter units per molecule, there was added 15 parts by weight of an organopolysiloxane of the formula

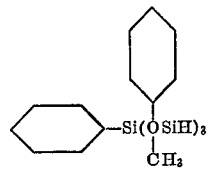

1.5 parts of dicumyl peroxide, and 0.0001 part of platinum in the form of a chloroplatinic acid solution. There were about 10 times as many vinyl groups as ≡SiH groups present in the mixture.

This mixture was cured for 6 hours at 250° F. to yield a clear, hard resin. The resin was tested for its electrical properties at room temperature and at 150° C.:

|  | Insulation Resistance (ohm/cm.) | Dielectric constant at 100 cycles/sec. | Dissipation factor at 100 cycles/sec. |
| --- | --- | --- | --- |
| Testing Temp.: |  |  |  |
| 25° C | 3×10¹⁴ | 2.59 | 0.0039 |
| 150° C | 5×10¹³ | 2.59 | 0.0039 |

Epoxy resins have a dissipation factor of about 0.3 at 150° C. and 100 cycles/sec.

EXAMPLE 2

To 90 parts by weight of a commercial styrenebutadiene liquid copolymer having an average of more than 15 pendant vinyl groups per molecule (Buton 100), there was added 10 parts of $$(CH_3)_3SiO(\overset{CH_3}{\underset{H}{Si}}O)_3Si(CH)_3$$

1.5 parts of dicumyl peroxide, and 0.0001 part of platinum in the form of a chloroplatinic acid solution. There were about 9.5 times as many vinyl groups as ≡SiH groups present in the mixture.

This mixture was cured for 6 hours at 250° F. to yield a clear, hard resin. The resin was tested for its electrical properties at room temperature and at 150° C.:

|  | Insulation Resistance (ohm/cm.) | Dielectric constant at 100 cycles/sec. | Dissipation factor at 100 cycles/sec. |
| --- | --- | --- | --- |
| Testing Temp.: |  |  |  |
| 25° C | 8.5×10¹⁵ | 2.41 | 0.0026 |
| 150° C | 2.5×10¹⁵ | 2.48 | 0.0017 |

EXAMPLE 3

To 90 parts by weight of the styrene-butadiene copolymer of Example 2 there was added 10 parts of an organopolysiloxane of the average formula

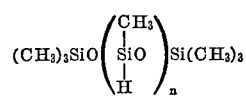

where $n$ has an average value of 4.7 and containing individual species having values of $n$ which range from 3 to 16, 1.5 parts of dicumyl peroxide, and 0.0001 part of platinum in the form of a chloroplatinic acid solution.

This mixture was cured for 6 hours at 250° F. to yield a cloudy, hard resin having excellent properties of electrical insulation. The cloudy effect in the resin was believed to be caused by the failure of the higher molecular weight species of the organopolysiloxane to dissolve in the styrene-butadiene resin. The undissolved species therefore did not participate in the curing reaction, but were entrapped in the cured resin as harmless impurities.

The above experiment was repeated, with the preliminary step of prereacting the organopolysiloxane ingredient in the presence of a chloroplatinic acid catalyst with about 25 mol percent of alpha-methylstyrene, based on the moles of the

units present, by heating the mixture for one hour at 80° C. This reaction caused about 25 percent of the

units present to be converted into

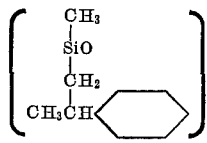

units, which increased the solubility of the organopolysiloxane in the styrene-butadiene copolymer.

The cured product of the repeated experiment was a clear, hard resin having excellent thermal stability and properties of electrical insulation at 150° C.

EXAMPLE 4

To 101.5 parts by weight of the uncured composition of Example 1 there was added 15 parts of a saturated polybutene polymer having a viscosity of 25–30 cs. at 25° C. to form a mixture having lower viscosity than the uncured composition of Example 1 alone.

The resulting homogeneous mixture was cured for 6 hours at 250° F. to yield a clear, hard resin having physical and electrical properties similar to the cured resin of Example 1.

EXAMPLE 5

To 75 parts by weight of the commercial styrene-butadiene copolymer of Example 2 there was added 25 parts by weight of

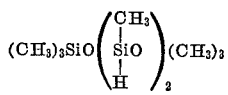

1.5 parts of dicumyl peroxide, and 0.001 part of platinum in the form of a chloroplatinic acid solution.

This mixture was cured for 6 hours at 250° F. to yield a product, which was a clear, flexible resin at room temperature, having excellent electrical properties.

That which is claimed is:
1. A curable composition consisting essentially of:
  (a) 100 parts by weight of an intimate mixture of:
    (1) from 75 to 95 weight percent of a liquid hydrocarbon polymer having an average of at least five $>C=CH_2$ groups per molecule and having an average molecular weight of from 1,500 to 100,000, and
    (2) from 5 to 25 weight percent of at least one organopolysiloxane compound which is soluble in (1) and which has an average of at least 2.0 silicon-hydrogen bonds per molecule, the other bonds present in (2) being selected from the group consisting of the siloxane bond and $RSi\equiv$ bonds where R is a monovalent hydrocarbon radical, free of aliphatic unsaturation, there being from 2 to 30 times as many $>C=CH_2$ groups in (1) as there are silicon-hydrogen bonds in (2),
  (b) from 1 to 4 parts of an organic peroxide curing catalyst,
  (c) a catalytic amount of platinum,
  (d) from 0 to 25 parts of an essentially saturated, hydrocarbon plasticizer for (a), and
  (e) from 0 to 200 parts of a filler.

2. The cured composition of claim 1.

3. The composition of claim 1 where the hydrocarbon polymer of (a) is a copolymer of butadiene and styrene which contains an average of at least 15 $>C=CH_2$ groups per molecule, and from 70 to 95 mol percent of butadiene units.

4. The composition of claim 1 where the organopolysiloxane compound contains

units.

5. The composition of claim 1 where the organopolysiloxane composition contains

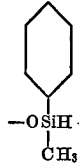

units.

6. The composition of claim 1 where the organopolysiloxane composition contains

units.

7. The composition of claim 1 where the organopolysiloxane composition contains

units.

References Cited

UNITED STATES PATENTS

| | | | |
|---|---|---|---|
| 2,448,556 | 9/1948 | Sprung | 260—46.5 |
| 2,867,603 | 1/1959 | Safford et al. | 260—37 |
| 3,288,879 | 11/1966 | Safford | 260—827 |

MORRIS LIEBMAN, *Primary Examiner.*

L. T. JACOBS, *Assistant Examiner.*

U.S. Cl. X.R.

260—827